April 21, 1959     T. A. DEAKINS ET AL     2,882,567
BACK WEIGHING AND POURING OF MOLTEN METAL INTO FOUNDRY MOLDS
Filed May 29, 1957
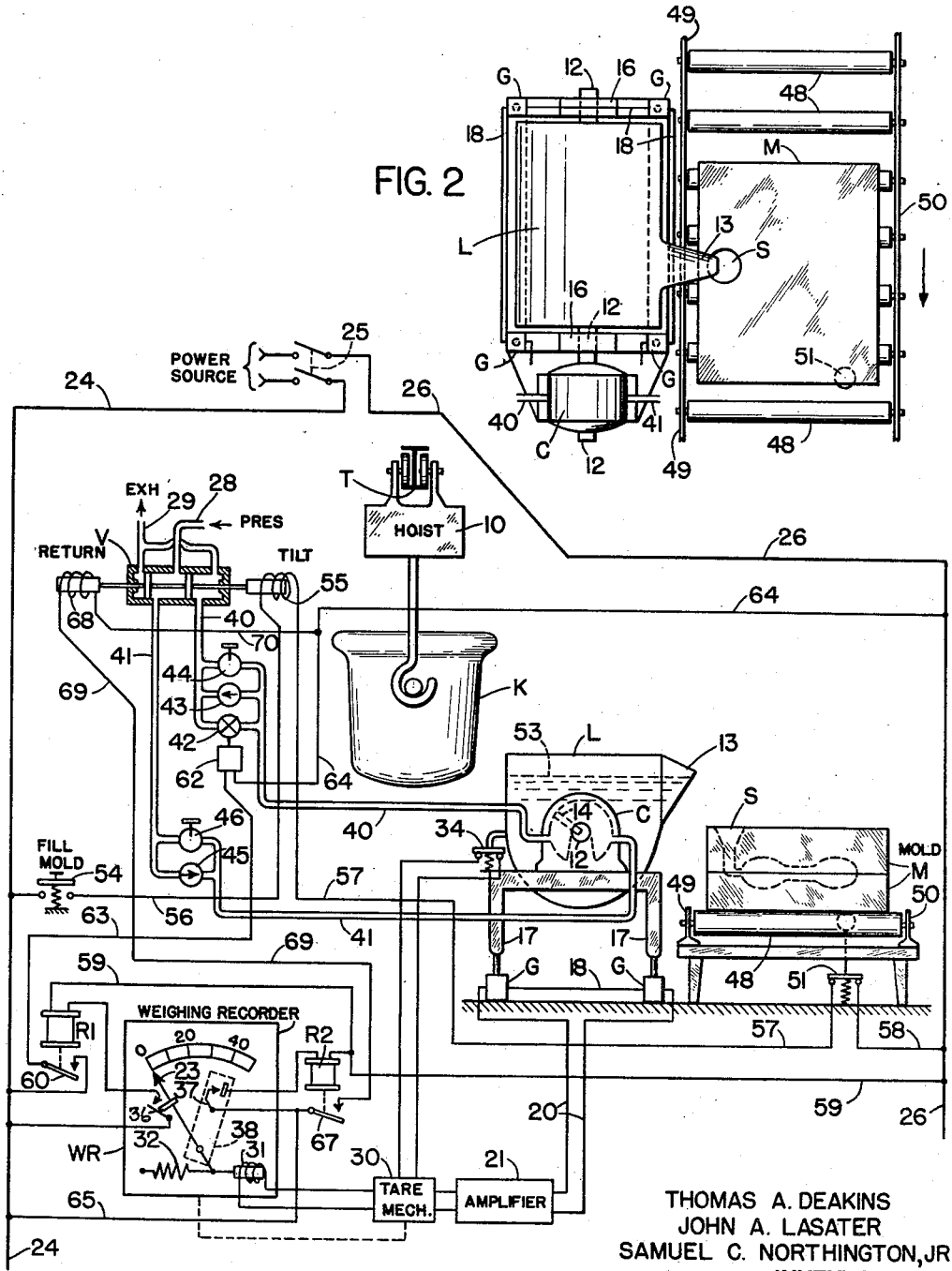
THOMAS A. DEAKINS
JOHN A. LASATER
SAMUEL C. NORTHINGTON, JR.
INVENTORS
BY R. F. Bryant
ATTORNEY United States Patent Office 2,882,567
Patented Apr. 21, 1959

2,882,567

BACK WEIGHING AND POURING OF MOLTEN METAL INTO FOUNDRY MOLDS

Thomas A. Deakins and John A. Lasater, Chattanooga, and Samuel C. Northington, Jr., Lookout Mountain, Tenn., assignors to Combustion Engineering, Inc., New York, N.Y., a corporation of Delaware Application May 29, 1957, Serial No. 662,389

8 Claims. (Cl. 22—82)

Our invention relates to the weighing and pouring of fluids such as molten metal, and it has special reference to new and improved facilities for the automatic weighing and pouring of molten metal as utilized to produce castings in a foundry.

Broadly stated, the object of our invention is to accomplish such automatic weighing and pouring by improved apparatus which operates on the "back" weighing principle and which serves to dispense measured quantities of molten iron or other metal into sand-lined or other molds wherein castings are to be formed.

A more specific object is to combine the weighing and pouring functions into a single ladle with resultant elimination of need for the separate weighing and pouring ladles which previously have been required.

Other objects are to cut down the number of operators who are needed to weigh and pour molten metal successively into foundry molds; to shorten the time that is required to accomplish such weighing and pouring; and to better the accuracy of the weighing.

A further object is to actuate the unitary weighing and pouring ladle selectively at the three tilt speeds of intermediate during approach and of slow during pouring and of fast during return.

Additional objects and advantages will become apparent as the disclosure and description hereof proceeds.

Illustrative equipment provided by us for practicing this invention is disclosed by the accompanying drawings wherein:

Figure 1 constitutes a schematic showing of apparatus and circuits novelly organized to effect an automatic "back" weighing and pouring of molten metal into foundry molds which are brought into receiving relation with that apparatus in successive order; and Figure 2 is a plan view showing how the pouring ladle and mold conveyor portions of that apparatus appear when viewed from the top.

In these drawing views we have schematically shown our new system as organized to effect automatic weighing and pouring of molten metals into the sprue openings S of foundry molds M which are brought into receiving relation with a combined weighing and pouring ladle L in successive order. That ladle L preferably is made large enough to contain a supply of molten metal that is sufficient to fill a number of the individual molds M; i.e., if each mold needs 30 pounds of metal to fill it then the weighing and pouring ladle L may have a capacity of several hundred pounds or enough to fill ten or more of the molds M.

Such molten metal as drawn from the cupola furnace (not shown) of the foundry installation can of course be delivered to ladle L in any suitable manner. Thus a main supply ladle K carried by a hoist car 10 suspended from an overhead monorail track may if desired be utilized to refill the ladle L with molten metal at suitable intervals during operation of the new automatic weighing and pouring facilities now being described.

The aforesaid weighing and pouring ladle L is carried by end trunnions 12 which normally hold it in the upright position indicated; but it also can be tilted forwardly for the purpose of pouring via spout 13 some of the molten metal therein into the mold M when in front thereof or otherwise in receiving relation therewith.

Such forwardly tilting movement is imparted to ladle L by a cylinder-type hydraulic motor C having a rotor vane 14 that is fixed to one of the ladle trunnions 12 in the manner shown by Figure 1. This cylinder-type motor C is driven by hydraulic fluid under the control of a valve V, and may for example be constructed as shown and described by U.S. Patent 2,633,105, issued March 31, 1953 to J. A. Lasater for "Vane Type Fluid Motor." If desired this tilting motor C can of course take some other form such as a conventional hydraulic cylinder (not shown) having a lengthwise-movable piston linked to one of side trunnions 12 via a piston rod and tilting arm (not shown).

Serving to carry the weight of ladle L and its contents and of the tilting motor C is suitable structure that includes end bearings 16 for ladle trunnions 12 (see Fig. 2) and four support legs 17 (see Fig. 1) which respectively rest upon four strain gages or load cells designated G in Figs. 1 and 2. Each of these strain gage type load cells G has the characteristic of changing its electrical resistance or output (which is convertible into voltage) with changes in the weight which it supports, and of in this way providing an electrical signal (such as voltage) from which an indication of the supported physical weight can be provided.

All four of these strain gages or load cells G are connected in series via conductors 18 (see Figs. 1 and 2) and their combined output feeds over conductors 20 into an amplifier 21 which strengthens the weight signals and applies them to a weighing recorder WR. This causes pointer 23 of the recorder to indicate the loss in weight of ladle L which accompanies the pouring of molten metal therefrom out of spout 13, all in a manner to be more fully described.

Such weight indications along with other governing influences are fed into electrical and hydraulic devices of our novelly organized system. Such devices include the instrument WR with associated relays R1 and R2 and the hydraulic valve V earlier named. As shown in Fig. 1, the electrical portions of our system are energized through a switch 25 which when closed connects main supply conductors 24 and 26 with some suitable power source such as a commercial 110 volt lighting circuit of either the alternating current or the direct current type. In the description which follows it will be assumed that there is in this manner made available between control conductors 24 and 26 a substantially constant electrical potential of about 110 volts.

The earlier mentioned hydraulic valve V and the hydraulic motor C which it controls may be connected with any suitable pressure supply apparatus such as a conventional hydraulic pump (not shown) with the oil or other pressure fluid being fed into the valve via the conduit 28 marked "Pres" and the exhaust fluid being taken away from the valve via conduit 29 marked "Exh." In the description which follows it will be assumed that these intake and exhaust lines 28 and 29 communicate with an oil pump which keeps line 28 under some suitable operating pressure such as of about five hundred pounds per square inch.

Looking further at weighing recorder WR, this instrument is provided with a tare mechanism 30 here illustratively shown as inserted between the amplifier 21 and the instrument winding 31 which receives the amplified weight signals from that amplifier. Also serving to determine the position of WR pointer 23 is a spring 32 the tension of which tends to move the top of pointer 23 forwardly (to the right in Fig. 1) along the instrument weight scale. This is in opposition to the solenoid plunger within winding 31 which tends to move the pointer top in the opposite direction (to the left in Fig. 1) to an extent dependent upon the energization intensity of that winding.

The tare mechanism 30 when activated serves to bring the WR pointer 23 to the zero reading before the start of each pouring of molten metal out of ladle L into a mold M. In the illustrative arrangement here shown such activation is governed by a limit switch contact 34 which closes upon return of the ladle L to its represented untilted position at the end of each pouring operation. Such bringing of pointer 23 to the zero position prior to the beginning of the next pouring operation thus is accomplished automatically in a manner that being known to those skilled in the instrumentation art will not be explained here. Instead it will suffice to say that the closure of the contact 34 which accompanies each return of ladle L to its untilted position causes mechanism 30 to operate in a way which automatically brings pointer 23 of weighing device WR to the zero position in readiness for recording from zero the weight of the molten metal next to be poured out of ladle L and into an empty mold M.

In said zero position the WR pointer 23 holds open a contact 36 which in conjunction with relay R1 governs the forward tilting speed of ladle L. Further provided in instrument WR is a second contact 37 which is mounted on an adjustable support 38 that may be set anywhere along the WR weight scale. In the illustration of Fig. 1 the setting is such that when pointer 23 registers 30 pounds it will engage and close contact 37 and acting through relay R2 stop the forward tilting of the ladle L.

Included in the system here represented are the above and other novel control facilities that cause ladle L to start its initial forward tilting at an "intermediate" speed which continues until the first metal from spout 13 is transferred out of ladle L and into mold M. At that point the forward tilting speed is reduced to a "slow" rate which continues until molten metal in desired predetermined weight has left ladle L and been received by the mold M. At that point the forward tilting of ladle L promptly stops and hydraulic motor C reverses to bring ladle L back to the represented position at a "fast" rate.

Cooperating with the weighing recorder WR in achieving such three-speed tilt control are a number of valve devices interposed as shown in the forward and return fluid conduits 40 and 41 by which the tilting motor C for ladle L is interconnected with its hydraulic control valve V. So included in forward conduit 40 is a normally open valve 42 plus a check valve 43 and a throttling valve 44; and so included in return fluid conduit 41 is another check valve 45 and another throttling valve 46.

Both check valves 43 and 45 permit fluid flow therethrough only in the direction indicated by the small arrows; wherefore they both are open to fluid flow from valve V to motor C via return conduit 41 and back to the valve via forward conduit 40, but not in the opposite direction. The throttling valve 46 in conduit 41 is adjusted for a rate of fluid flow which produces the aforesaid "intermediate" speed on the part of tilting motor C; and the throttling valve 44 in conduit 40 is adjusted for a further reduced rate of fluid flow which produces the aforementioned "slow" speed on the part of tilting motor C and ladle L.

It also is to be pointed out that the hydraulic valve V is of such a construction that the piston assemblage thereof remains either in the left position (represented) or in the right position following energization of the left or the right activating winding for the valve, and there so stays until the opposite activating winding is energized when the piston assemblage then shifts to the opposite position.

Our new weighing and pouring system is of course useable to serve molds M of a wide variety of sizes and types, including sand-lined and other. In the arrangement illustratively shown the molds M to be filled with measured quantities of molten metal are brought in front of and into receiving relation with the tiltable ladle L along a conventional conveyor that includes rollers 48 carried by left and right side supports 49 and 50. In moving along the top surfaces of these rollers 48 each empty mold M depresses and closes a limit switch 51 upon reaching the position where sprue opening S is directly beneath the ladle pouring spout 13. After being filled each mold M in being further moved (as in the direction indicated by the Fig. 2 arrow) out of registry with ladle L uncovers limit switch 51 and allows same to open (as by spring action) until another empty mold is brought into the ladle-registering position along conveyor rollers 48. Said limit switch 51 serves a purpose later to be explained.

*How the represented system operates*

Attention now will be directed to the manner in which the complete system of Figs. 1–2 operates in performing its intended function of dispensing accurately weighed charges of molten metal from ladle L into the sprue openings S of foundry molds M that successively are brought into receiving relation with ladle L.

Assume first that an empty mold M occupies the represented position (on conveyor rollers 48) in front of ladle L. Such occupancy keeps limit switch 51 in the closed position shown. Further assume that ladle L contains molten metal 53 in suitable supply quantity; also that this ladle L is upright and untilted, wherefore closed contact 34 has caused tare mechanism 30 to position the pointer 23 of weighing recorder WR at zero in readiness for registering how much molten metal is transferred out of the ladle when same is subjected to forward tilting.

Power switch 25 is now closed; and to start the cycle of automatic weighing and pouring a "fill mold" push button 54 is depressed. This completes for the right winding 55 of valve V an energizing circuit which extends from the first supply conductor 24 through push button 54, conductor 56, the valve winding 55, conductor 57, closed limit switch 51 beneath mold M, and conductor 58 back to the second supply conductor 26.

Winding 55 now shifts the piston assemblage of valve V to the right and thereby flows pressure fluid from conduit 28 to the left side of tilting motor C by way of fluid conduit 40 and the normally open valve 42 therein. Such fluid moves rotor vane 14 clockwise to the right at an "intermediate" speed set by the adjustment of throttling valve 46 in return conduit 41. It will be seen that the fluid to the right of motor vane 14 must during such clockwise rotation return to valve V (and exhaust 29) via conduit 41 and said throttling valve 46.

Ladle L accordingly now is tilted at said intermediate speed during the full range of approach movement. This continues until molten metal 53 first starts to pour from spout 13 into the empty mold M. The metal then first leaving ladle L lightens the total weight supported by strain gages G and by decreasing the energization of WR winding 31 allows spring 32 to move the top of WR pointer 23 to the right away from zero with an accompanying closure of contact 36. Such closure picks up relay R1 by connecting its winding between supply conductors 24 and 26 over a circuit which includes conductor 59.

Such R1 pick up closes the relay contact 60 to complete for a winding 62 of valve 42 an energizing circuit which includes conductors 63 and 64 and which causes winding 62 to close the aforementioned normally open valve 42. This now closed valve 42 blocks all fluid flow therethrough and requires that the driving fluid received by tilting motor C via conduit 40 pass through the parallel throttling valve 44 in that conduit. Said throttling valve 44 is adjusted to reduce the forward tilting speed of ladle L to any "slow" rate desired.

The "slow" tilting of ladle L now thus effected by motor C continues with accompanying transfer of molten metal into mold M until a predetermined weight of such metal has been transferred out of ladle L and into the mold. To simplify explanation it will be assumed that such weight is 30 pounds, for which the selector element 38 in weighing recorder WR has previously been set. All during such pouring the intensity with which strain gages G energize WR winding 31 progressively diminishes with resultant advancement (by spring 32) of pointer 23 to the right.

When the metal thus poured out of ladle L into mold M attains the desired predetermined weight (assumed to be 30 pounds) said WR pointer 23 closes contact 37 and picks up relay R2 by connecting its winding between supply conductors 24 and 26 over a circuit which includes conductors 65 and 59. Thus now picked up, contact 67 of relay R2 energizes the left winding 68 of valve V by connecting it between supply conductors 24 and 26 over a circuit which includes conductors 65, 69, 70 and 64.

Winding 68 now moves the piston assemblage of valve V to the left. This shifts the flow of pressure fluid from conduit 40 to conduit 41 with resultant reversal in the movement of motor C's vane 14 from clockwise to counterclockwise rotation. Such new counterclockwise movement proceeds at the "fast" rate since check valve 45 now permits free flow of fluid from valve V through conduit 41 into the right side of tilting motor C and check valve 43 similarly permits free flow of fluid from the left of vane 14 through conduit 40 and back to valve V.

Ladle L is in this way quickly returned to its represented level position at the aforesaid "fast" rate of speed. Result is quick and positive cut-off in the flow of metal out of ladle L once the predetermined desired weight (assumed to be 30 pounds) of the metal has been received by the mold M.

Such return of ladle L closes contact 34 to activate tare mechanism 30. This again causes instrument WR to return its pointer 23 to zero in readiness for weighing a succeeding charge of molten metal as same later is poured out of ladle L.

The initially empty mold represented at M in Figs. 1 and 2 now has been filled with its desired measured quantity of molten metal and hence is ready for moving away from the represented position immediately in front of ladle L. Such removal movement (along conveyor rollers 48 in the arrangement illustrated) may be accomplished either manually or by automatic mechanical means (not shown). It is accompanied by an opening of the limit switch contact 51. A new or empty mold M now can be brought into receiving position in front of ladle L either manually or by automatic means (not shown). Such new and empty mold when in said receiving position recloses limit switch 51.

The automatic weighing and pouring system now is ready for another cycle which exactly duplicates the one already described. That is to say, weighing recorder WR has once more (under the action of tare mechanism 30) moved its pointer 23 back to zero; and the closed limit switch 51 indicates that another empty mold M has its sprue openings S aligned beneath ladle spout 13 and thus is in position to receive a weighed charge of molten metal from that spout.

To start the second action cycle it is merely necessary to depress the "fill mold" push button 54. This sets into action a sequence of steps exactly duplicating those already described as imparting to ladle L an intermediate-speed tilting during the approach range, a slow-speed tilting during the time that molten metal 53 is being poured via spout 13 into the empty mold M and a fast-speed return movement of ladle L upon transfer therefrom into the mold of a predetermined desired quantity (assumed to be 30 pounds) of the poured metal.

Succeeding action cycles duplicating those already described can of course be repeated with resultant filling of additional empty molds M. Ultimately the level of molten metal 53 in ladle L will drop to the point where replenishment is necessary; and such replenishment can be effected in any desired manner as by a transfer of more molten metal from the main supply ladle K into the combined weighing and pouring ladle L of our new system.

Following such replenishment of the molten metal supply in ladle L the tare mechanism 30 operates automatically to return to zero the pointer 23 of weighing recorder WR; wherefore the system is caused to operate with desired reliability and effectiveness regardless of whether the quantity of molten metal in ladle L is large or intermediate or small.

In certain instances it may be desired to make the filling of each new empty mold M fully automatic and hence independent of any manual control. In the system of Fig. 1 this may be achieved by eliminating the "fill mold" push button 54 and by connecting conductor 56 directly with the supply main 24. In the system so modified limit switch 51 will automatically start the pouring from ladle L as soon as each new empty mold M arrives in the represented receiving position wherein its sprue opening S is aligned beneath pouring spout 13.

With such modification (wherein push button 54 is eliminated) it will be advantageous to include somewhere in the energizing circuit (comprised of conductors 56—57—58) for valve V winding 55 a time delay relay (not shown) which permits that circuit initially to be completed (upon closure of contact 51) for a time which is relatively short and which is followed by an opening of the circuit at said included relay. With such an arrangement valve winding 55 has current passed therethrough only long enough to permit that winding to shift the valve V piston assemblage to the right; and in this way there is avoided the prolonged flow of current through the winding 55 which otherwise would take place.

*Summary*

As previously indicated our improved weighing and pouring facilities are usable to dispense measured quantities of molten metal into molds of a wide variety of sizes and types (including sand-lined and other) and forms; wherefore the particular mold represented at M is intended to be illustrative of all such sizes and types and forms of molds including both static (here represented) and rotative (not shown) which either are brought directly into receiving relation with the ladle pouring spout 13 or which receive the molten metal from that spout by means of an intermediate conduit or the like.

Regardless of the environment in which used the practice of our invention is accompanied by a number of benefits. One such benefit comes from our novel combination of the weighing and pouring functions into a single ladle L with resultant elimination of the prior need for weighing and pouring ladles which are separate and distinct one from the other.

Other benefits and advantages include reduction in the number of operators who are needed to weigh and pour metal into foundry molds of the sand-lined and other variety including both static and rotative types; a shortening in the time that is required to accomplish such weighing and pouring; a bettering in the accuracy of the weighing, since when instrument WR is set for a given quantity of delivered metal our system will faithfully and with high accuracy hold that desired metal quantity within close limits during cycle after cycle; and improved provision for activating the combined weighing and pouring ladle at the three tilting speeds of intermediate during approach slow during pouring and fast during return.

Our invention accordingly is broad in its application and hence is not to be restricted to the specific form here disclosed by way of illustration.

What we claim is:

1. In a system for pouring accurately weighed charges of molten metal into foundry molds, the combination of a ladle for containing a supply of the molten metal and having a spout and being mounted for tilting so as to deliver into an empty mould when in receiving relation with said spout, mechanism operable when activated in a forward sense to tilt said ladle with accompanying flow of molten metal out of said spout and further operable when activated in a reverse sense to return the ladle to its original untilted position, weighing means sensitive to the total weight of said ladle plus the molten metal contained therein and serving during each forward tilting of the ladle to give an indication when the molten metal leaving said ladle via said pouring spout has decreased said total weight by a predetermined amount equal to the weight of metal which is desired for delivery into said empty mold, and control means activated by said weight-loss indication for causing said mechanism to stop the forward tilting of said ladle and to return that ladle to its untilted position with stoppage in metal pour at the start of such return.

2. In a system for pouring accurately weighed charges of molten metal into foundry molds, the combination of a ladle for containing a supply of the molten metal and having a spout and being mounted for tilting so as to deliver into an empty mold when in receiving relation with said spout, mechanism operable when activated in a forward sense to tilt said ladle with accompanying flow of molten metal out of said spout and further operable when activated in a reverse sense to return the ladle to its original untilted position, an assemblage for supporting the weight of said ladle and the molten metal contained therein plus the weight of the ladle mounting and of said tilting mechanism, weighing means sensitive to the total ladle and other weight as supported by said assemblage and serving during each forward tilting of the ladle to give an indication when the molten metal leaving said ladle via said pouring spout has decreased said total weight by a predetermined amount equal to the weight of metal which is desired for delivery into said empty mold, and control means activated by said weight-loss indication for causing said mechanism to reverse the forward tilting of said ladle with accompanying return of the ladle to its untilted position.

3. In a system for pouring accurately weighed charges of molten metal into foundry molds, the combination of a ladle for containing a supply of the molten metal and having a spout and being mounted for tilting so as to deliver into an empty mold when in receiving relation with said spout, mechanism operable when activated in a forward sense to tilt said ladle with accompanying flow of molten metal out of said spout and further operable when activated in a reverse sense to return the ladle to its original untilted position, strain gage load cell means for supporting the total weight of said ladle plus the molten metal contained therein, a weight-loss-measuring instrument activated by the output of said strain gage means with resultant sensitivity to said total ladle plus metal weight and serving during each forward tilting of the ladle to given an indication when the molten metal leaving said ladle via said pouring spout has decreased said total weight by a predetermined amount equal to the weight of metal which is desired for delivery into said empty mold, and control means activated by said weight-loss indication for causing said mechanism to reverse the forward tilting of said ladle with accompanying return of the ladle to its untilted position.

4. In apparatus for pouring accurately weighed charges of molten metal into foundry molds, a ladle for containing a supply of the molten metal and having a spout and being mounted for tilting so as to deliver into an empty mold when in receiving relation with said spout, mechanism operable when activated in a forward sense to tilt said ladle with accompanying flow of molten metal out of said spout and further operable when activated in a reverse sense to return the ladle to its original untilted position. strain gage load cell means for supporting the total weight of said ladle plus the molten metal contained therein, a weight-loss-measuring instrument activated by the output of said strain gage means with resultant sensitivity to said total ladle plus metal weight, said instrument having a pointer which during each forward tilting of the ladle serves to give an indication when the molten metal leaving said ladle via said pouring spout has decreased said total weight by a predetermined amount equal to the weight of metal which is desired for delivery into said empty mold, control means activated by said weight-loss indication for causing said mechanism to reverse the forward tilting of said ladle with accompanying return of the ladle to its untilted position, and taring means for said instrument activated upon each such ladle return and then serving to readjust said instrument pointer back to zero in readiness for indicating the further loss in total ladle weight which will take place when another empty mold has molten metal poured thereinto from said ladle.

5. In a system for pouring accurately weighed charges of molten metal into foundry molds, the combination of a ladle for containing a supply of the molten metal and having a spout and being mounted for tilting so as to deliver into an empty mold when in receiving relation with said spout, means including a hydraulic motor operable when supplied with forward-direction pressure fluid to tilt said ladle and cause flow of molten metal out of said spout and further operable when supplied with reverse-direction pressure fluid to return the ladle to its original untilted position, weighing means sensitive to the total weight of said ladle plus the molten metal contained therein and serving during each forward tilting of the ladle to give a first weight-loss indication when molten metal first begins to pour out of said ladle spout and to give a second weight-loss indication when the decrease in said total weight due to the metal pouring equals the weight of metal which is desired for delivery into said empty mold, control means activated by said first weight-loss indication for throttling admission of forward-direction pressure fluid into said hydraulic motor with resultant slowing in the speed of said forward ladle tilting while the metal pouring is in progress, and other control means activated by said second weight-loss indication for replacing supply of said throttled forward-direction pressure fluid to said hydraulic motor by a supply of unthrottled reverse-direction pressure fluid which by reversing the motor stops said slow-speed forward tilting of the ladle and quickly returns the ladle to its untilted position at a fast speed.

6. Apparatus for pouring accurately weighed charges of molten metal into foundry molds comprising, in combination, a ladle for containing a supply of the molten metal and having a spout and being mounted for tilting so as to deliver into an empty mold when in receiving relation with said spout, mechanism operable when activated in a forward sense to tilt said ladle at an intermediate speed during approach to the position where molten metal begins to flow out of said spout and further operable when activated in a reverse sense to return the ladle at a fast speed to its original position, weighing means sensitive to the total weight of said ladle plus the molten metal contained therein and serving during each forward tilting of the ladle to give a first weight-loss indication when molten metal first starts to pour from said ladle and later to give a second weight-loss indication when the decrease in said total weight due to the metal pouring equals the weight of metal which is desired for delivery into said empty mold, control means activated by said first weight-loss indication for causing said mechanism to reduce the speed of said forward ladle tilting to a slow rate while metal pouring is in progress, and other control means activated by said second weight-loss indication for causing said mechanism to stop the forward tilting of said ladle and to return that ladle to its untilted position at the aforementioned fast rate of speed.

7. In a system for pouring accurately weighed charges of molten metal into foundry molds, the combination of a ladle for containing a supply of the molten metal and having a spout and being mounted for tilting so as to deliver into an empty mold when in receiving relation with said spout, mechanism operable when activated in a forward sense to tilt said ladle with accompanying flow of molten metal out of said spout and further operable when activated in a reverse sense to return the ladle to its original untilted position, weighing means sensitive to the total weight of said ladle plus the molten metal contained therein and including a weight-loss-indicating instrument provided with contacts which during each forward tilting of the ladle respond when the molten metal leaving said ladle via said pouring spout has decreased said total weight by a predetermined amount equal to the weight of metal which is desired for delivery into said empty mold, said control means being activated by the said response of said instrument contacts for causing said mechanism to reverse the forward tilting of said ladle with accompanying return of the ladle to its untilted position.

8. Apparatus for pouring accurately weighed charges of molten metal into foundry molds comprising, in combination, a ladle for containing a supply of the molten metal and having a spout and being mounted for tilting so as to deliver into an empty mold when in receiving relation with said spout, mechanism operable when activated in a forward sense to tilt said ladle at an intermediate speed during approach to the position where molten metal begins to flow out of said spout and further operable when activated in a reverse sense to return the ladle at a fast speed to its original untilted position, weighing means sensitive to the total weight of said ladle plus the molten metal contained therein and including a weight-loss-indicating instrument provided with first contacts which during each forward tilting of the ladle respond when the molten metal first begins to pour from said ladle and also with second contacts which later respond when the decrease in said total weight due to the metal pouring equals the weight of metal which is desired for delivery into said empty mold, control means activated by the said response of said first contacts for causing said mechanism to reduce the speed of said forward ladle tilting to a slow rate while the metal pouring is in progress, and other control means activated by the said response of said second contacts for causing said mechanism to stop the forward tilting of said ladle and return that ladle to its untilted position at the aforementioned fast rate of speed.

References Cited in the file of this patent

UNITED STATES PATENTS

| | | |
|---|---|---|
| 2,753,605 | Carleton | July 10, 1956 |
| 2,768,413 | Alexanderson | Oct. 30, 1956 |

OTHER REFERENCES

The Iron Age, pages 77–80, December 5, 1946.